April 16, 1935.    M. J. SULLIVAN    1,998,105
INTERMITTENT SOUND REPRODUCING DEVICE
Filed March 21, 1932    3 Sheets-Sheet 1

INVENTOR.
Michael J. Sullivan
BY John F. Brezina
ATTORNEY.

April 16, 1935.　　　M. J. SULLIVAN　　　1,998,105
INTERMITTENT SOUND REPRODUCING DEVICE
Filed March 21, 1932　　3 Sheets-Sheet 2

INVENTOR.
Michael J. Sullivan
BY John F. Brezina
ATTORNEY.

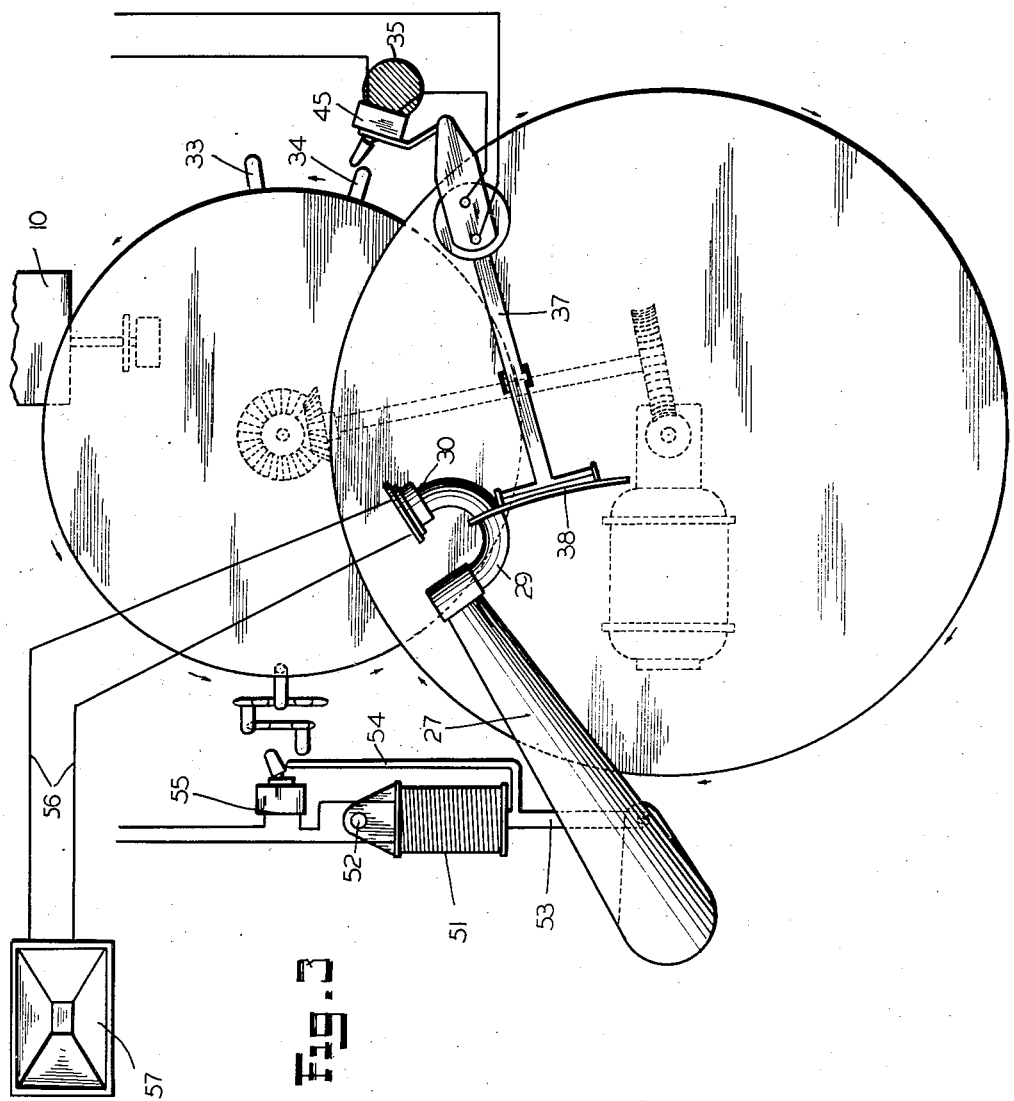

Patented Apr. 16, 1935

1,998,105

UNITED STATES PATENT OFFICE 1,993,105

INTERMITTENT SOUND REPRODUCING DEVICE

Michael J. Sullivan, Chicago, Ill.

Application March 21, 1932, Serial No. 600,153

5 Claims. (Cl. 274—9)

This invention relates to a device for intermittently announcing time or reproducing any recorded sound, and embodies the usual and necessary parts of a phonograph. Heretofore electric and other clocks have been made to strike a bell or gong to indicate the time at quarterly or half-hour periods. My invention is designed for use particularly in connection with electric clocks, either individually as in the home, or my device may be used as a master unit and the announced time transmitted through electric wires to a multiplicity of separate rooms; for example, as in an office building, school building or the like where uniform, accurate time is highly desirable.

An important object of my invention is the provision of a compact apparatus embodying a rotatable turntable, a sound reproducing element and mechanism, and apparatus for intermittently and selectively raising said element and also for returning the sound reproducing mechanism to starting position on a record at predetermined intervals.

A further important object of my invention is the provision of a mechanism of the class described and which is controlled from an electric clock which embodies means for rotating a sound record, means for reproducing the sound, means for intermittently moving the reproducing element vertically, as well as means for returning the reproducing element and its attached parts to starting position on a record at predetermined and selected times.

A further object of my invention is the provision of a time announcing device of the class described which embodies apparatus for selectively elevating or lowering a sound reproducing element and for moving the sound reproducing means to starting position upon a record at a predetermined time, all of said means being controlled from an electric clock.

A further object of my invention is the provision of a device for announcing time or reproducing sound which embodies an element on which sound is recorded and means for reproducing the same, such as is employed in a phonograph or other known electrical reproducing element devices, and which is controlled from an electric clock and is adapted to operate and reproduce the sound intermittently, either near the apparatus or at remote distant points in the same or separate buildings.

Other and further important objects of this invention will be apparent from the disclosures in the specification and the accompanying drawings.

This invention (in a preferred form) is illustrated in the drawings and hereinafter more fully described.

On the drawings:

Fig. 3 is a top plan view of my time announcing device and showing the tone arm and reproducing element and means for movably supporting the same.

As shown on the drawings:

Figure 1:
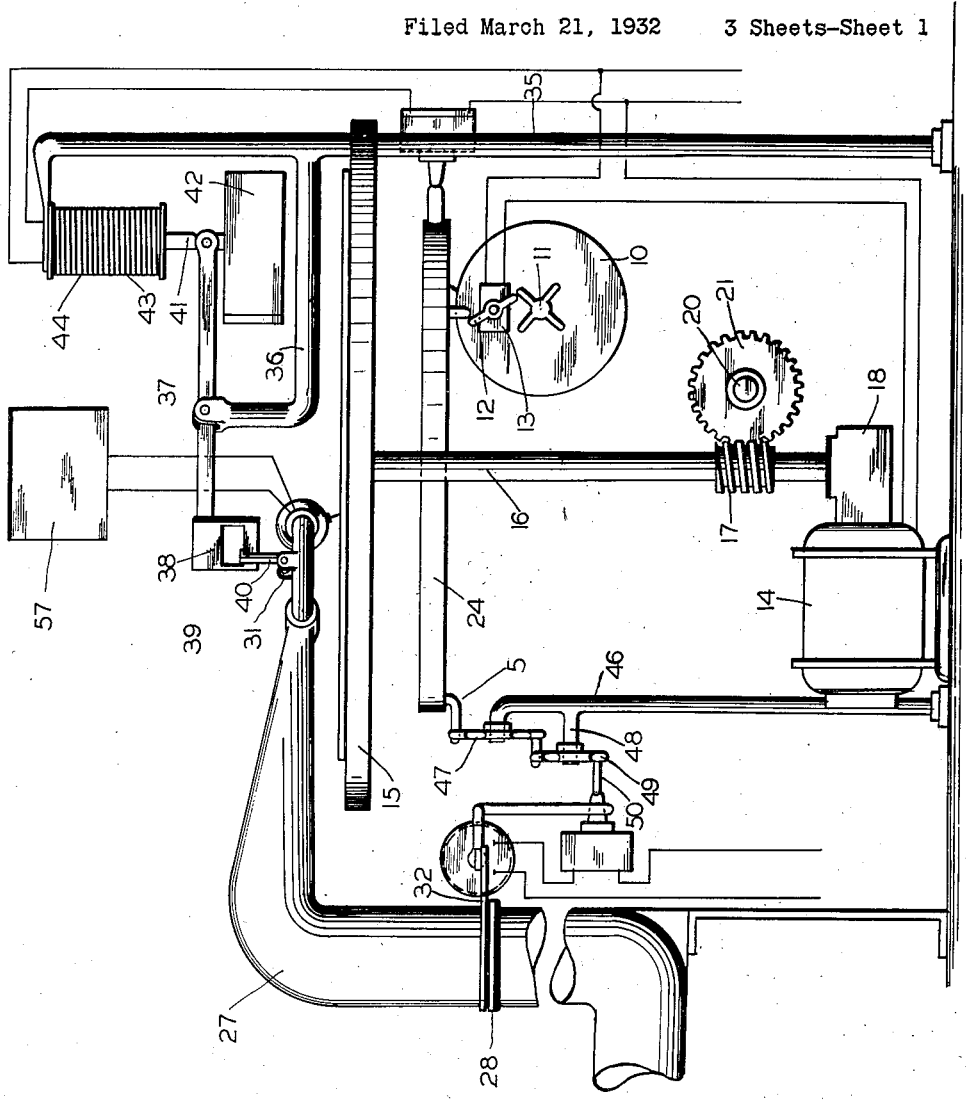
Fig. 1 is a side elevational view of my device showing the relative positions of the working parts.

As shown in Figs. 1 and 3, the reference number 10 indicates a portion of an electric clock which has a horizontal shaft 11 projecting rearwardly therefrom, the ends of said shaft terminating in four radially projecting arms, as shown. Upon the rear of the clock is secured an electrical contact switch (not shown) which is adapted to hold said switch normally open. A switch key 12 outside of the switch 13 is adapted to be partially rotated to close said switch by the respective arms of the shaft 11 at fifteen-minute intervals, thereby closing a circuit which connects the electric motor 14 to a source of electricity. Fig. 1 shows the switch 12 in closed position just after one of the arms of the shaft 11 has passed it.

A flat turntable 15 is mounted as shown on the upper end of downwardly extending shaft 16 which is journalled in a suitable bearing secured on top of the upright supporting bracket 19. Said shaft has its lower end journalled in and connected to a speed reducer 18 which is directly secured to and driven by the electric motor 14. A spiral gear 17 is concentrically mounted about the shaft 16 a short distance above said speed reducer for a purpose which will appear hereinafter. The turntable 15 is of conventional construction and is adapted to support and rotate therewith a sound record or the like.

Journalled in a suitable bearing on a downwardly extending arm of bracket 19 is a horizontal shaft 20 which carries a gear wheel 21 on one end thereof and which gear wheel meshes and is driven by the spiral gear 17. A shorter vertical shaft 23 is journalled in a suitable journal box at its lower end and also in a bearing secured on the supporting bracket 19. To the upper end of said shaft 23 is secured in horizontal position a circular control wheel 24 which is adapted to rotate with said shaft 23. A bevel gear 25 is concentrically mounted on the shaft 23 and is driven by and meshes with a bevel gear 26 which is securely mounted upon the end of the shaft 20. The aforesaid spiral gear and bevel gears are of a size so that the speed of the control board 24 will be such as to rotate once every fifteen minutes while the turntable 15 will rotate approximately forty times during each fifteen-minute period.

Figure 2:
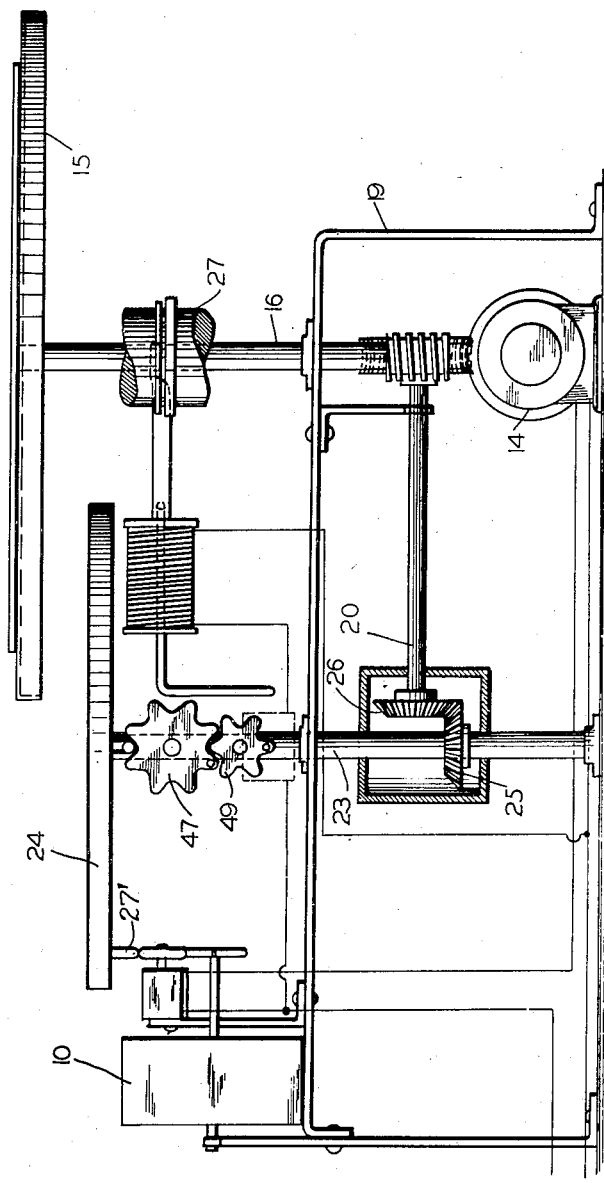
Fig. 2 is a fragmentary side elevation taken from the left of Fig. 1 showing in more detail the mechanism for returning the tone arm to starting position on a record.

As shown in Figs. 1 and 2, the control plate 24 carries a downwardly extending stud 27' which upon one complete rotation of said plate during which period as announcement is made, will contact the switch key 12 of the control switch 13 to open said switch to cause the motor 14 to stop rotating.

A right angled tone arm 27 of conventional construction has its lower end enlarged and swivelly journalled within an annular bearing 28 which connects the same to a lower stationary horn (only part of which is shown) so that said tone arm is horizontally movable with respect to said apparatus. A reproducer 30, which includes vibrating diaphragms, a removable needle and other parts, is tiltably secured with respect to the free end of the tone arm 27 through a U-shaped tube member 29, the other end of said tube member 29 being rotatably mounted in the end of said tone arm in a manner well known in the art. A pair of upwardly extending apertured ears 31 are formed integral with the upper side of said tube member to provide convenient means to connect thereto elevating and lowering mechanism which will later be described. A horizontally projecting ear 32 is secured to the lower portion of the tone arm immediately above the annular bearing 28, said ear providing means to connect a mechanism for returning the tone arm to starting position which will later be described.

As clearly shown in Fig. 3, the control plate 24 carries a pair of radially extending studs 33 and 34 respectively which are spaced only a short distance apart, said distance being such that the time required for said control plate to rotate the distance between said studs will permit a complete announcement of the time through a lowering of the reproducer, which will hereinafter be described.

As shown in Fig. 1, a vertical steel standard 35 is securely mounted to a base as shown and has its upper end bent at right angles and flattened out to support an electromagnet which will be described. A right angled horizontally projecting arm 36 is formed integral with said standard 35, said arm terminating in a bifurcated apertured end in which a lever 37 is pivoted intermediate its ends by means of a pivot bolt, as shown. The outer end of said lever 37 terminates in a T, the ends of which are secured to horizontally extending ears of an arcuate shaped rectangular plate 38 which has an elongated horizontal slot 39 thereon. A link member 40 having its upper end hooked on said slot and slidable therealong has its other end pivotally secured to the ears 31 on the U-shaped tube 29 which carries its reproducer. The arcuate shaped plate 38 is of sufficient width so as to permit normal horizontal movement of the reproducer as the needle thereof reproduces successive sounds and travels toward the center of the record, the link 40 merely sliding along said slot.

Pivoted on the opposite end of the lever 37 is a short vertical post 41 which carries a counterweight 42 on its lower end and an attractor plate 43 on its upper end. An electro-magnet 44 is secured to the horizontally extending end of standard 35 in a position to said attractor plate so that when energized, it will attract said plate and raise the counterweight 42 and tilt the lever 37 to cause the needle of the reproducer 30 to contact the sound record.

As illustrated in Fig. 1, the electro-magnet 44 must be energized only at intermittent and substantially regular intervals and short periods of time sufficient to permit the reproduction of the announcement or sound desired. To accomplish this, I provide an electric control switch 45 of a conventional type, clearly shown in Fig. 3, having an outer projecting lever which when moved in the same direction, will alternately close and open a connected circuit. As the control wheel 24 rotates in counterclockwise direction of Fig. 3 the radial stud 33 will engage said switch to close the circuit to energize the electro-magnet 44 to lower the reproducing element to contact with the record. As the stud 34 is of such a distance from the stud 33 that the desired announcement will have been completed, the stud 34 will engage the lever of the control switch 45 to press the same in the same direction to open the circuit, which will de-energize the electro-magnet 44 to cause the counterweight 42 to raise the reproducer off the record. It will be apparent that this will occur once during each revolution of the control wheel 24, the speed of which is such that the announcement will be made at predetermined and regular intervals.

It will be seen that as the successive announcements are made the reproducer will travel toward the center of the record, as is well known. As there will be a predetermined and fixed number of announcements upon the record, I have provided means whereby the tone arm and reproducing element will be shifted horizontally to starting position when the needle of the reproducer has been elevated from contact with the sound record after making the last announcement at the center thereof. For example, in my preferred construction the announcements are made every fifteen minutes and the record used contains forty-eight spaced apart announcements.

As shown in Fig. 1, a vertical metal standard 46 having its upper end bent at right angles and its lower end secured in a metal base has rotatably mounted on said horizontally extending end a gear wheel 47 which in the preferred form has eight teeth and an outwardly projecting stud on the srface of one of said teeth, as clearly shown in Figs. 1 and 2. Rotatably mounted immediately below said gear wheel 47 on an arm 48 formed integral with the standard 46 is a second gear wheel 49 which also has a horizontally projecting stud 50 on its face. The position of the gear wheel 49 is such that it will be engaged by the stud of the gear wheel 47 and be rotated the distance of one tooth for each revolution of the gear wheel 47. In my preferred form the gear wheel 49 has six teeth. The position of the standard 46 and the upper gear wheel 47 is such that said gear wheel will be rotated the distance of one tooth by engagement of a short stud 51 formed on the surface of the control board 24. It will be apparent that with the construction just described and of the stated preferred ratio of gears, the control board will have to rotate forty-eight times to cause the stud 50 of the lower gear wheel 49 to pass a certain point once.

As clearly shown in Fig. 3, an electro-magnet 51 is pivoted at tone end by a bolt 52 to a stationary post (not shown). A lever 53 has one end pivoted to the end of the ear 32 which is secured to the rotatable shank of the tone arm, while the other end of said lever is bifurcated to form two spaced apart arms, one of said arms being relatively short and slidable in a hole in the electro-magnet 51 and the other arm 54, which is comparatively longer at certain times, is adapted to press against the lever of a control switch 55 which controls the electricity to the electromagnet 51.

By means of the mechanism described above, including the gear wheel 47 and 49, the stud 59 of the gear wheel 49 will be brought into contact with the lever of the control switch 55 to close said switch at a time when the needle of the reproducer 39 has completed the last announcement on the record. The closing of said switch 55 will cause the electro-magnet 51 to be energized, which will attract the plate on the arm of the lever 53 and pull said lever to move the tone arm and reproducer horizontally to starting position upon a record. During this movement the link member 40 will slide along a slot of the plate 38 as heretofore described. As soon as the tone arm has been moved to substantially starting position on the record, the arm 54 of lever 53 will contact the lever of the switch 55 to open said switch and thereby de-energize the electro-magnet 51.

It will be aparent from the foregoing description that after the tone arm and reproducing element have again been returned to starting position on the record the operation described will be successively repeated.

As shown in Figs. 1 and 3, the reproducer 30 may be connected by a pair of wires 56 to an electrical sound amplifier or other device used in the radio art and in the reproduction of recorded music, which in the drawings is illustrated by a horn 57. As previously stated, the reproduced sound may be transmitted to numerous distant points and in so doing, the standard and existing telephone circuit may be employed.

I am aware that many changes may be made and numerous details of the invention and construction thereof may be varied through a wide range without departing from the principles of this invention, and I therefore do not desire to limit the patent granted thereon otherwise than necessitated by the prior art.

I claim as my invention:

1. In combination a turntable adapted to be connected to and driven by a motor and support a sound record; a control wheel rotatably mounted adjacent said turntable; gear connections between said control wheel and said turntable shaft whereby said control wheel is rotated; a pair of spaced apart studs on said control wheel a horizontally movable tone arm; a reproducing element movable on the free end of said tone arm; a lever having one end extending over said tone arm and a weight on its other end; a fulcrum support for said lever, an arcuate flat anchoring member on the end of said lever having a horizontally extending slot; a connecting link having one end slidably engaging said anchoring member and its other end pivoted on said reproducing element; an electro-magnet mounted adjacent said lever and connected in an electric circuit; and a control switch mounted adjacent said control wheel adapted to be opened and closed by said studs on said control wheel to intermittently energize and de-energize said electromagnet to cause said reproducer to be lowered intermittently.

2. A time announcing device of the class described comprising a rotatably mounted turntable adapted to support a sound record; a motor connected to and adapted to drive said turntable; a horizontally movable tone arm mounted adjacent said turntable; a sound reproducing device mounted on the free end of said tone arm and movable vertically; means above said turntable for selectively elevating and lowering said reproducing device comprising a lever support, a pivoted lever, a horizontally slotted member on said lever forming a track, a link slidable in said slot and pivoted to said reproducing element, a weight on said lever adapted to normally hold said reproducing device out of contact with said record and an electro-magnet adapted to intermittently raise said lever and weight to cause said reproducing element to contact said record; and means for intermittently and selectively energizing said electro-magnet.

3. In an apparatus of the class described, a rotatable member adapted to support and rotate a sound record; a control wheel driven by said rotatable member; a motor for driving said member; a swivelly mounted arm adjacent said rotatable member; a sound reproduced movably mounted on the end of said tone arm and adapted to reproduce the sound recorded on a record; a metal standard adjacent said rotatable member; an electro-magnet secured thereon; movable means adapted to move said reproducer vertically and actuable by said electro-magnet; a control switch on said standard and in the circuit of said electro-magnet; means secured on said tone arm for moving the same horizontally; an electro-magnet mounted adjacent thereto for moving said means; a control switch in the circuit of the electromagnet; means adjacent said control wheel actuable by said control wheel adapted to intermittently close said last mentioned control switch.

4. In an intermittent sound reproducing apparatus, a motor; a control switch in the circuit of said motor and actuable by clockwork; a rotatable turntable connected to and driven by said motor and adapted to support a sound record; a swivelly mounted tone arm; a sound reproducer movably mounted on said tone arm; electrically impelled means mounted adjacent said tone arm; a rotatable member connected to and driven by said turntable adapted to intermittently open said control switch; a radially extending stud on said rotatable member; reduction gearing intermittently actuable by said stud and to cause said electrically impelled means to move said tone arm and reproducer horizontally to starting position.

5. In an intermittent sound reproducing apparatus, a motor; a control switch in the circuit of said motor and actuable by clockwork; a rotatable turntable connected to and driven by said motor and adapted to support a sound record; a swivelly mounted tone arm; a sound reproducer movably mounted on said tone arm; an electromagnet mounted above said turn table; an intermittently operable switch connected in circuit with said electro-magnet, said switch being operable from said turntable; means connected to and actuable by said electro-magnet to intermittently elevate or lower said reproducer; a rotatable member connected to and driven by said turntable adapted to intermittently open said control switch, and means for moving said tone arm and its connected reproducer horizontally, comprising an electro-magnet, a lever, and a control switch for said last mentioned electro-magnet, said last mentioned tone arm moving means being adapted to intermittently and selectively operate said last mentioned control switch.

MICHAEL J. SULLIVAN.